United States Patent Office 2,982,664
Patented May 2, 1961

2,982,664

CERAMIC BODY

Daniel W. Luks and Clark Kenyon, Frenchtown, N.J., assignors to Frenchtown Porcelain Company, Trenton, N.J., a corporation of New Jersey No Drawing. Filed Feb. 29, 1960, Ser. No. 11,474

3 Claims. (Cl. 106—39)

This invention relates to certain novel ceramic bodies and in particular to ceramic bodies having great physical strength combined with excellent thermal and electrical characteristics such as high thermal conductivity, and low dielectric loss factors, a combination of properties in great demand in electrical apparatus.

Beryllia and alumina compositions have been known and used in making products such as refractories and spark-plug insulators. Normally a substantial quantity of silica is also incorporated in such compositions. The presence of silica, however, tends to reduce the mechanical strength of the resulting bodies, insofar as it replaced alumina, and the thermal conductivity of the bodies insofar as it replaces beryllia.

It has now been discovered that a new and useful series of bodies can be made using the system BeO.MnO or preferably $Al_2O_3$.BeO.MnO. Specifically, it is found that when the proportion of beryllia in such bodies is maintained above about 10%, the resulting structure is not only highly conductive thermally, but is exceedingly strong and in fact compares favorably with the strongest commercially available products. Moreover, such bodies can be fired at temperatures substantially below bodies in related systems.

Specifically, the present invention comprises fired ceramic bodies consisting essentially of (wt. percent):

BeO _____ 10–98
MnO _____ 2–40
$Al_2O_3$ _____ 0–88

Alumina is preferably used in a proportion of at least 3%, with a corresponding reduction in the BeO maximum to 95%.

The optimum combination of properties is in general found within the region defined by the following proportions (wt. percent):

BeO _____ 10–50
MnO _____ 2–40
$Al_2O_3$ _____ 10–88

In making the novel bodies, the two or three components may be added as such, i.e. as $Al_2O_3$, MnO and BeO or in any other convenient form, for example, as some other oxide, or as the carbonate. Mixed oxides may be used; for example, $MnO.Al_2O_3$, galaxite, may be used as a source of both manganese oxide and alumina. Of course, care should be taken not to introduce significant amounts of other elements into the composition.

Prior to shaping the desired bodies, the ingredients are reduced to a particle size of say .003″ to .002″ and thoroughly mixed. To aid in shaping the bodies the essential ingredients may be mixed with water and, if desired, with a small quantity, not more than say 10%, of a clay. Since clays normally contain a large proportion of $SiO_2$ they must be used with extreme care to insure that they do not adversely affect the strength of the finished product. To avoid this it is often desirable to omit the clay and to use instead an organic material which upon firing will be completely destroyed, to aid in shaping the body. Mixtures of cellulose acetate in acetone are an example of such organic material.

The composition may be shaped by extrusion, molding, pressing or any other convenitonal means and is then fired. Unlike many other ceramics the present bodies need not be fired in an inert atmosphere; in fact it is preferred to fire in air. The maximum firing temperature will vary considerably but will in general be from say 1450° C. to 1600° C. The body is preferably brought to maximum temperature at a rate not exceeding say 36° C./min.; maintained at temperature from say 60 to 120 minutes and cooled at a maximum rate of say 30° C./min.

The invention will be further described with reference to the following specific examples which are given for purposes of illustration only and are not to be taken as in any way limiting the invention beyond the scope of the appended claims.

EXAMPLES I TO VIB

In carrying out Examples I to VIB, the various compositions were prepared, using $MnO_2$ as the manganese source with $Al_2O_3$ and BeO. Five percent of a clay having the following composition (percent by weight) was used to aid in shaping.

| | |
|---|---|
| $SiO_2$ | 60.15 |
| $Al_2O_3$ | 19.88 |
| $Fe_2O_3$ | 2.97 |
| FeO | 0.54 |
| $TiO_2$ | 0.08 |
| CaO | 0.67 |
| $Na_2O$ | 2.60 |
| $K_2O$ | 0.40 |
| MgO | 2.20 |
| $P_2O_5$ | 0.01 |
| Ignition loss | 10.50 |
| | 100.00 |

Prior to mixing, the particle size for all components was reduced to less than .003″. After milling to insure proper mixing, the batch was pressed into a ¼″ cylinder 1¼″ long and fired in air at cone 20 (1520° C.). The rate of heating was about 36° C./min. The bodies were left at temperature for 60 minutes and then cooled at about 30° C./min. After firing they were tested for modulus of rupture. The results are shown in Table I below.

Referring to Table I, it will be seen that with increasing alumina and decreasing beryllia (MnO constant), the strength of the bodies gradually increased, up to a maximum of 73.25% $Al_2O_3$—19.21% BeO. However, when the beryllia content was decreased below 10% the strength fell off sharply. Thus in Example VIA a body containing 82.82% $Al_2O_3$, 3.93% MnO and only 9.63% BeO showed a modulus of rupture of only 28,200 p.s.i.

The importance of the manganese component is illustrated by the fact that in Example VIB a composition similar to that of Example VI but omitting the MnO (fired composition $Al_2O_3$ 77.4%, BeO 19.1%) could not be matured at cone 20. At cone 30 (1650° C.) it was fully matured, but had a modulus of rupture of only 41,600 p.s.i., compared to 64,900 obtained with Example VI at cone 20.

Table I

| Example | Raw Batch—Wt. percent | | | | Fired Body—Wt. percent | | | | Modulus of Rupture, p.s.i. |
|---|---|---|---|---|---|---|---|---|---|
| | BeO | MnO$_2$ | Al$_2$O$_3$ | Clay | BeO | MnO | Al$_2$O$_3$ | Other | |
| I | 90.25 | 4.75 | 0.00 | 5.00 | 91.51 | 3.93 | 1.01 | 3.55 | 31,600 |
| II | 80.75 | 4.75 | 9.50 | 5.00 | 81.87 | 3.93 | 10.65 | 3.55 | 35,300 |
| III | 61.75 | 4.75 | 28.50 | 5.00 | 62.61 | 3.93 | 29.91 | 3.55 | 39,700 |
| IV | 38.00 | 4.75 | 52.25 | 5.00 | 38.53 | 3.93 | 53.99 | 3.55 | 55,200 |
| V | 28.50 | 4.75 | 61.75 | 5.00 | 28.90 | 3.93 | 63.62 | 3.55 | 51,000 |
| VI | 19.00 | 4.75 | 71.25 | 5.00 | 19.21 | 3.93 | 73.25 | 3.55 | 64,900 |
| VIA | 9.50 | 4.75 | 80.75 | 5.00 | 9.63 | 3.93 | 82.82 | 3.55 | 28,200 |
| VIB | 19.00 | | 76.00 | 5.00 | 19.1 | | 77.4 | 3.55 | 41,600 |

EXAMPLES VII–X

These examples were carried out by forming a raw batch from the appropriate quantity of MnO$_2$, BeO and Al$_2$O$_3$ with 5.00 parts by weight of the same clay used in Examples I–VIB.

The ingredients of the raw batch were reduced in particle size to below about .003" and milled to insure mixing. Sufficient water was added to insure workability.

The mixture was then extruded into cylindrical bodies ½" in diameter and 6.0" long which were then fired in air at various temperatures as indicated below. The rate of heating was 36° C./min.; the bodies remained at temperature for about 60 minutes and were cooled at about 30° C./min. Various tests were then carried out on the bodies. The results are shown in Table II below.

Table II

| Example | Raw Batch—Wt. percent | | | | Fired Body—Wt. percent | | | | Firing Temp., °C. | Modulus of Rupt., p.s.i. | Therm. Cond.[1] | Loss Factor |
|---|---|---|---|---|---|---|---|---|---|---|---|---|
| | BeO | MnO$_2$ | Al$_2$O$_3$ | Clay | BeO | MnO | Al$_2$O$_3$ | Other | | | | |
| VII | 28.50 | 9.50 | 57.00 | 5.00 | 29.16 | 7.93 | 59.33 | 3.58 | 1,450 | 27,800 | | .0159 |
| VIII | 19.00 | 4.75 | 71.25 | 5.00 | 19.21 | 3.93 | 73.25 | 3.55 | 1,650 | 39,000 | .0083 | .0051 |
| IX | 38.00 | 9.50 | 47.50 | 5.00 | 38.87 | 7.93 | 49.62 | 3.58 | 1,450 | 32,100 | .0232 | .0145 |
| X | 38.00 | 4.75 | 52.25 | 5.00 | 38.53 | 3.93 | 53.99 | 3.55 | 1,650 | 33,500 | .0400 | .0054 |

[1] Cals./sec./sm.$^2$/cm./° C.

The substantially lower rupture moduli of Examples VII–X, compared to Examples I–VIB, are attributable to the fact that the Examples VII–X bodies were extruded rather than pressed. This is particularly evident from a comparison of Examples VI and VIII which are of very similar composition.

Table II shows that bodies according to the invention have good electrical and thermal properties as well as high strength.

We claim:
1. A fired ceramic body consisting essentially of, percent by weight,

BeO _____ 10–98
MnO _____ 2–40
Al$_2$O$_3$ _____ 0–88

2. A fired ceramic body consisting essentially of, percent by weight,

BeO _____ 10–95
MnO _____ 2–40
Al$_2$O$_3$ _____ 3–88

3. A fired ceramic body consisting essentially of, percent by weight,

BeO _____ 10–50
MnO _____ 2–40
Al$_2$O$_3$ _____ 10–88

References Cited in the file of this patent
UNITED STATES PATENTS

| | | |
|---|---|---|
| 1,879,589 | Tama | Sept. 27, 1932 |
| 1,896,042 | Ruben | Jan. 31, 1933 |
| 2,033,300 | Reichmann | Mar. 10, 1936 |
| 2,547,406 | Morin | Apr. 3, 1951 |
| 2,564,859 | Rogers | Aug. 21, 1951 |

OTHER REFERENCES

Phase Diagrams for Ceramicists, pub. 1956 by American Ceramic Society, Inc., Figure 35.